April 25, 1961     G. H. BARTEL     2,981,465
ELECTRICAL STOCK PROD
Filed July 1, 1960

INVENTOR.
GEORGE H. BARTEL
BY
Merchant & Merchant
ATTORNEYS

United States Patent Office 2,981,465
Patented Apr. 25, 1961

2,981,465

ELECTRICAL STOCK PROD

George H. Bartel, Minneapolis, Minn., assignor to Hot Shot Products Co., Minneapolis, Minn., a corporation of Minnesota Filed July 1, 1960, Ser. No. 40,318

5 Claims. (Cl. 231—2)

This invention relates generally to livestock handling equipment, and more particularly it relates to an electrical stock prod for use in loading or moving all kinds of livestock.

The use of reliable electrical live stock prods with controlled voltage output has been highly recommended by meat packers, live stock loss prevention bureaus, cargo insurance companies, veterinarians and humane societies as the most efficient method of moving and handling livestock. However, although stock prods have been in use for some time, they have generally not produced optimum satisfaction to the users thereof since they have been characterized by prodding heads which facilitated prodding of a uni-directional nature only. This is because the electrodes on the prodding heads of previous types of stock prods were generally so arranged as to allow prodding only in a direction generally perpendicular to the body surface of the animal.

In light of the above, an important object of this invention is the provision of an electrical stock prod which may be efficiently operated from any angle or position and which may be therefore effectively used in all livestock handling and moving situations which may be encountered.

Another object of this invention is the provision of an electrical stock prod which may be effectively used in loading and moving all kinds of livestock harmlessly and safely by means of a controlled electric shocking current.

Another object of this invention is the provision of an electrical stock prod which is provided with a novel form of secondary electrodes which enable the entire prodding head of the stock prod to become charged when the prod is energized.

Still another object of this invention is the provision of an electrical stock prod which may be effectively and conveniently used while working in close quarters, such as in livestock loading jobs where loading chutes are commonly in use.

Another object of this invention is the provision of an electrical stock prod in which the output of the high potential shocking current thereof is sufficient to move the most stubborn of animals.

A further object of this invention is the provision of an electrical stock prod which is balanced so as to provide efficient and tireless usage thereof.

Other objects of this invention reside in the provision of an electrical stock prod which is economical to produce, strong and durable throughout continued use and highly efficient in the vindication of its purposes.

The above and still further objects of this invention will become apparent from the following detailed specification, appended claims and attached drawings.

Referring to the drawings wherein like reference characters indicate like parts or elements throughout the several views.

Figure 1:
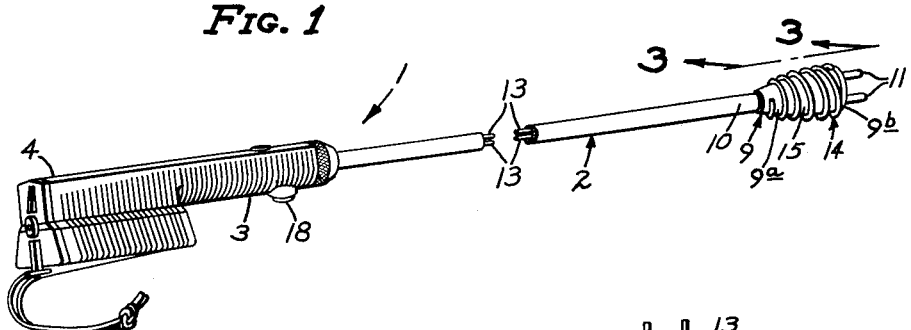
Fig. 1 is a view in perspective of my invention.
Figure 2:
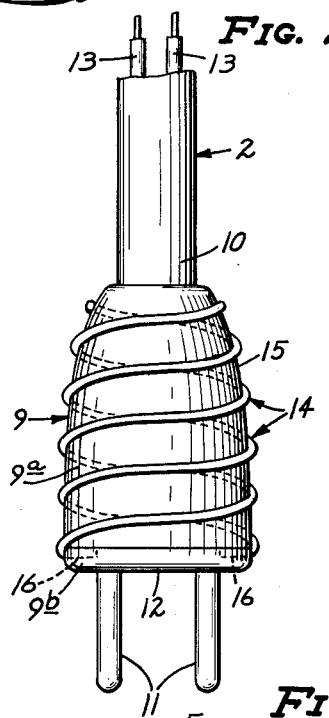
Fig. 2 is an enlarged view in elevation of a portion of the device shown in Fig. 1, some parts being broken away and some parts shown in section.
Figure 3:
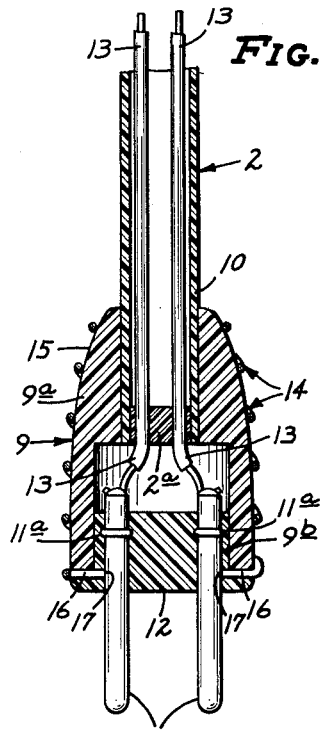
Fig. 3 is an enlarged view in section taken on the line 3—3 of Fig. 1.
Figure 4:
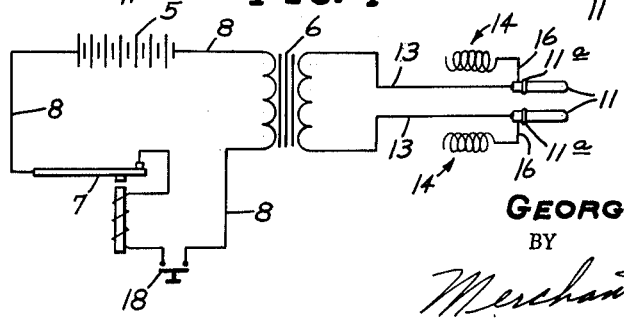
Fig. 4 is a diagrammatic view of the electrical circuit of my invention.

Referring with greater particularity to the drawings, the reference numeral 1 represents my electrical stock prod in its entirety. The stock prod 1 comprises an elongated generally tubular prodding stem, represented generally by the reference numeral 2, which defines a hand grip portion 3 adjacent one end 4 thereof. The stock prod 1 carries a source of high potential shocking current produced by a battery or batteries 5, a voltage step-up transformer 6 and vibrator means 7, all of which are connected by suitable circuit means 8, as shown in Fig. 4. An elongated cross-sectionally circular generally tubular core, represented in general by the reference numeral 9, is secured as with a suitable adhesive, not shown, to the other end 10 of the stem 2. The core 9 is formed from a non-conducting material, such as plastic or any other suitable material, and comprises an elongated generally tubular portion 9a and a cap portion 9b which is rigidly secured to the tubular portion 9a. A spaced pair of elongated primary shocking electrodes 11 are secured, as by the circumferential ribs 11a, within the cap portion 9b of the core 9 and project longitudinally from the outer end 12 thereof. The primary electrodes 11 are connected by leads 13 which extend through the tubular stem 2 and through the core 9 to the source of high potential current. The leads 13 are maintained within the end 10 of the stem 2 by the grommet 2a.

For the purpose of providing shocking means which may be easily contacted from any direction with respect to the longitudinal axis of the stem 2, a pair of generally helically coiled secondary electrodes, represented generally by the reference numeral 14, are alternately convoluted about the longitudinal exterior surface 15 of the core 9. The ends 16 of each of the secondary electrodes 14 abut against the primary electrodes 11, as at 17, so as to connect said secondary electrodes 14 to the source of high potential current. It should be noted that each convolution of each of the secondary electrodes 14 is spaced adjacent a convolution of a different one of said secondary electrodes so as to be adaptable for easy circuit bridging therebetween by the body of the contacted animal, not shown. In accordance with my invention, the secondary electrodes 14 are so coiled about the longitudinal exterior surface 15 of the core 9 as to be self-clamping thereabout, and therefore do not require the use of extraneous means to secure the same to the core 9.

It should be obvious from the above description that my invention will be extremely useful in handling livestock since the combination of the helically coiled secondary electrodes 14 with the longitudinally projecting primary electrodes 11 produces a shocking area which will impart a shock to the body of the contacted animal without regard to the direction from which the animal is prodded. Thus, when the switch 18 is moved to its closed position, preferably at the instant the animal is prodded, both the primary electrodes 11 and the secondary electrodes 14 become charged with high potential shocking current.

This invention has been thoroughly tested and found to be completely satisfactory for the accomplishment of the above objects; and while I have shown a preferred embodiment thereof, I wish it to be specifically understood that the same may be modified without departure from the scope and spirit of the appended claims.

What I claim is:

1. An electrical stock prod comprising an elongated prodding stem defining a hand-grip portion adjacent one end and carrying a source of high potential shocking current, a spaced pair of primary shocking electrodes extending longitudinally from the other end of said stem, and a pair of generally helically coiled secondary electrodes alternately convoluted about the exterior surface of said stem, and circuit means connecting said primary and secondary electrodes to said source of high potential shocking current, each convolution of each of said secondary electrodes being spaced adjacent a convolution of a different one of said secondary electrodes so as to be adaptable for easy circuit bridging therebetween by the body of the contacted animal.

2. An electrical stock prod comprising an elongated prodding stem defining a hand-grip portion adjacent one end and carrying a source of high potential shocking current, a spaced pair of primary shocking electrodes extending longitudinally from the other end of said stem and connected by leads extending through said stem to said source of high potential current, and a pair of generally helically coiled secondary electrodes alternately convoluted about the exterior surface of said stem and connected to said source of high potential current, each convolution of each of said secondary electrodes being spaced adjacent a convolution of a different one of said secondary electrodes so as to be adaptable for easy circuit bridging therebetween by the body of the contacted animal.

3. An electrical stock prod comprising an elongated prodding stem defining a hand-grip portion adjacent one end and carrying a source of high potential shocking current, an elongated cross sectionally circular non-conducting core secured to the other end of said rod, a spaced pair of primary shocking electrodes projecting longitudinally from the end of said core and connected by leads extending through said stem and said core to said source of high potential current, and a pair of generally helically coiled secondary electrodes alternately convoluted about the exterior surface of said core, each of said secondary electrodes being connected to a different one of said primary electrodes, each convolution of each of said secondary electrodes being spaced adjacent the convolution of a different one of said secondary electrodes so as to be adaptable for easy circuit bridging therebetween by the body of the contacted animal.

4. An electrical stock prod comprising an elongated prodding stem defining a hand-grip portion adjacent one end and carrying a source of high potential shocking current, an elongated cross-sectionally circular non-conducting core secured to the other end of said stem, a spaced pair of primary shocking electrodes molded within said core and projecting longitudinally from the end thereof, said primary electrodes being connected by leads extending through said stem and said core to said source of high potential current, and a pair of generally helically coiled secondary electrodes alternately convoluted about the longitudinal exterior surface of said core, each of said secondary electrodes being connected to a different one of said primary electrodes, each convolution of each of said secondary electrodes being spaced adjacent a convolution of a different one of said secondary electrodes so as to be adaptable for easy circuit bridging therebetween by the body of the contacted animal.

5. The structure defined in claim 4 in which each of said primary electrodes define laterally outwardly opening recesses each of which receives one end of a different one of each of said secondary electrodes, said secondary electrodes being so coiled about the longitudinal exterior surface of said core as to be self-clamping thereabout.

References Cited in the file of this patent

UNITED STATES PATENTS

| 1,140,365 | Dixon | May 25, 1915 |
| 2,561,122 | Juergens | July 17, 1951 |